(12) United States Patent
Guo et al.

(10) Patent No.: US 7,657,280 B2
(45) Date of Patent: Feb. 2, 2010

(54) WIRELESS SIGNAL RECEIVING APPARATUS WITH CLAMPING DEVICE AND SPEAKER DEVICE

(75) Inventors: Yan-Liang Guo, Taipei (TW); Chen-Hsing Wang, Taipei Hsien (TW)

(73) Assignee: Lite-On Technology Corp., Taipei (TW)

( * ) Notice: Subject to any disclaimer, the term of this patent is extended or adjusted under 35 U.S.C. 154(b) by 493 days.

(21) Appl. No.: 11/460,997

(22) Filed: Jul. 31, 2006

(65) Prior Publication Data

US 2007/0287492 A1 Dec. 13, 2007

(30) Foreign Application Priority Data

Jun. 8, 2006 (TW) .............................. 95209997 U

(51) Int. Cl.
*H04M 1/00* (2006.01)
(52) U.S. Cl. .................................. 455/550.1; 455/41.2
(58) Field of Classification Search .............. 455/550.1, 455/41.1, 41.2, 41.3
See application file for complete search history.

(56) References Cited

U.S. PATENT DOCUMENTS

| 5,426,825 | A | * | 6/1995 | Soren et al. .................. 24/3.12 |
| 6,097,308 | A | * | 8/2000 | Albert et al. ............... 340/7.54 |
| 6,917,797 | B1 | * | 7/2005 | Hoppa ..................... 455/404.1 |
| 2005/0231356 | A1 | * | 10/2005 | Bish et al. ................ 340/539.1 |
| 2006/0166722 | A1 | * | 7/2006 | Gu .......................... 455/575.8 |
| 2006/0180621 | A1 | * | 8/2006 | Ladouceur .................. 224/269 |
| 2007/0026908 | A1 | * | 2/2007 | Chen ....................... 455/575.2 |
| 2007/0270196 | A1 | * | 11/2007 | Wu ......................... 455/575.2 |
| 2007/0283033 | A1 | * | 12/2007 | Bloebaum et al. ........... 709/231 |

* cited by examiner

*Primary Examiner*—CongVan Tran
(74) *Attorney, Agent, or Firm*—Rosenberg, Klein & Lee

(57) ABSTRACT

A wireless signal receiving apparatus for receiving a wireless signal is disclosed. The wireless signal receiving apparatus includes a main body and a clamping device. The main body includes a signal processing module installed in a housing of the main body for processing the wireless signal. The clamping device is fixedly coupled to the housing for providing a force in order to fix an object between the housing and the clamping device, thereby clamping the wireless signal receiving apparatus upon the object.

11 Claims, 10 Drawing Sheets

WIRELESS SIGNAL RECEIVING APPARATUS WITH CLAMPING DEVICE AND SPEAKER DEVICE

BACKGROUND OF THE INVENTION

1. Field of the Invention

The present invention provides a wireless signal receiving apparatus, and more particularly a Bluetooth signal receiving apparatus with a clamping device and a speaker device.

2. Description of the Prior Art

Developing communications technology has dramatically affected people's lives, with the majority of people owning at least one cell-phone. Cell-phones have been proven to be particularly popular with automobile owners, enabling drivers to quickly contact emergency services in the event of an accident. However, accidents often occur if a driver holds their cell-phone when their vehicle is in motion, thus utilizing a hands-free earphone can avoid accidents. It is well known that a prior art Bluetooth wireless apparatus comprises various functions, one of them being a Bluetooth earphone. Normally, the prior art Bluetooth earphone is a hanging type of earphone that, because of the limitation of output volume of such earphones, has to hang upon the user's ear when in use. If the user hangs the prior art Bluetooth earphone upon the ear for a long time (e.g. standby by mode or communicating mode), they will experience some discomfort. Therefore, a Bluetooth earphone that has speaker function and clamping function should be created.

Please refer to FIG. 1. FIG. 1 illustrates a prior art mobile Bluetooth wireless communication apparatus 10. Although the prior art mobile Bluetooth wireless communication apparatus 10 comprises a speaker 12, its utilization is limited to a car. The prior art mobile Bluetooth wireless communication apparatus 10 must receive an operating voltage through a plug terminal 14 in a car, and thus cannot be utilized in outside situations.

Please refer to FIG. 2. FIG. 2 illustrates another prior art Bluetooth earphone apparatus 20, comprising a hanging device 22 and a Bluetooth earphone 24, wherein the Bluetooth earphone 24 and hanging device 22 are two separate apparatus. Although the prior art Bluetooth earphone apparatus 20 comprises a hanging device 22 that can hang the Bluetooth earphone apparatus 20 when it is not in use, the Bluetooth earphone apparatus 20 does not comprise any speaker device. Accordingly, when receiving incoming calls, the user has to separate the hanging device 22 and Bluetooth earphone 24 in order to place the Bluetooth earphone 24 into the ear adequately, thereby increasing the risk to the driver.

SUMMARY OF THE INVENTION

Therefore, a wireless signal receiving apparatus with speaker and clamping functions is disclosed to solve the above-mentioned problems.

According to an embodiment of the present invention, a wireless signal receiving apparatus for receiving a wireless signal is disclosed. The wireless signal receiving apparatus includes a main body, comprising a signal processing module installed in a housing of the main body for processing the wireless signal; and a clamping device, fixedly coupled to the housing for providing a force in order to fix an object between the housing and the clamping device, thereby clamping the wireless signal receiving apparatus upon the object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
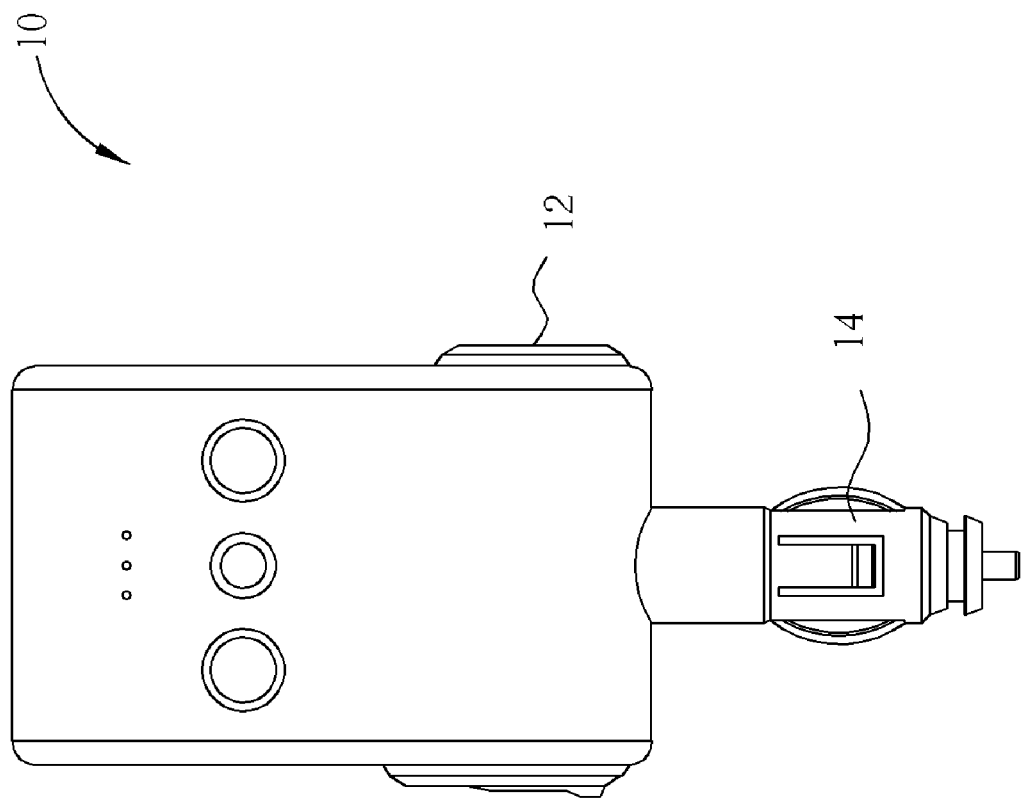
FIG. 1 is a diagram illustrating a prior art mobile Bluetooth wireless communication apparatus.
Figure 2:
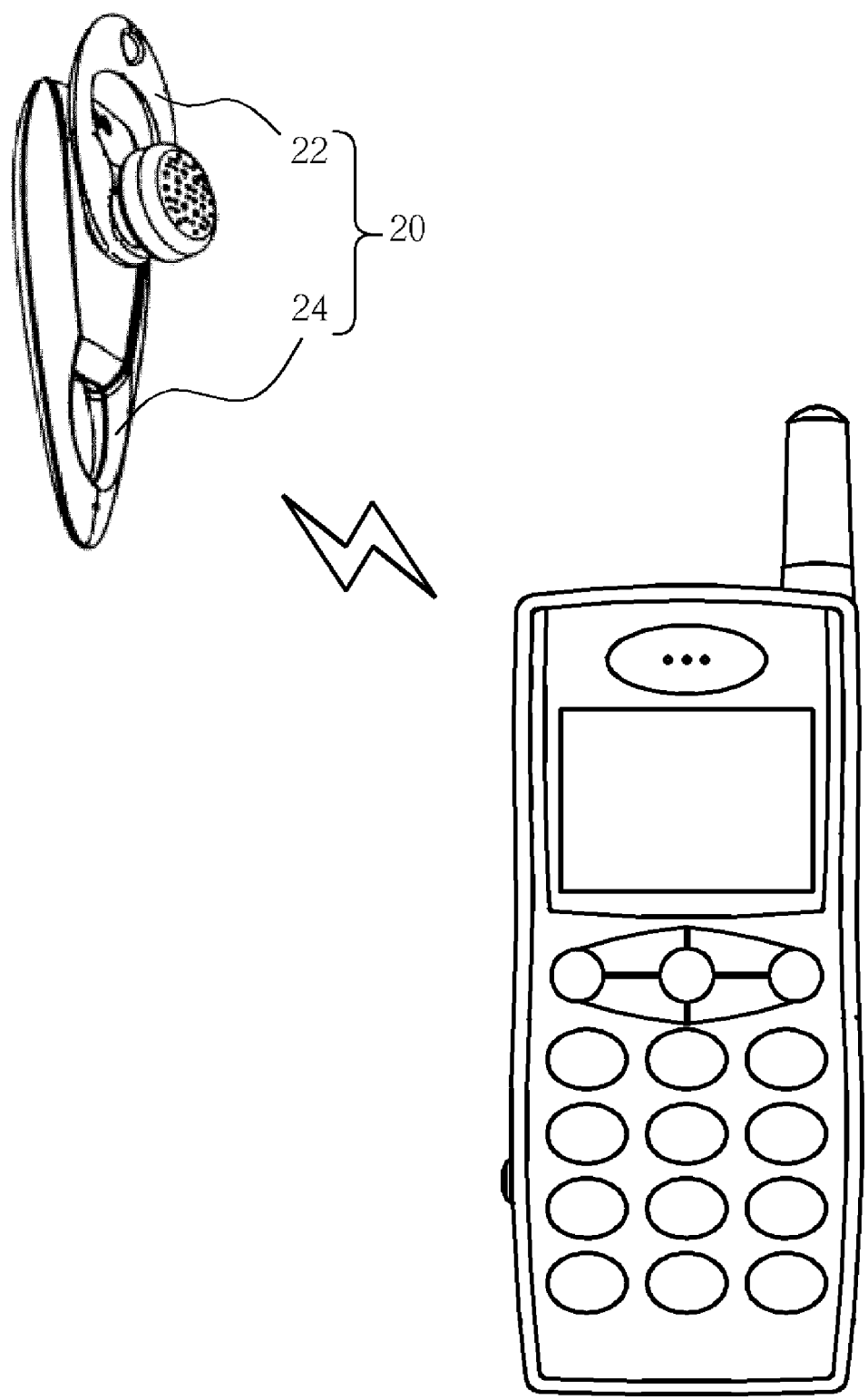
FIG. 2 is a diagram illustrating another prior art Bluetooth earphone apparatus.
Figure 3:
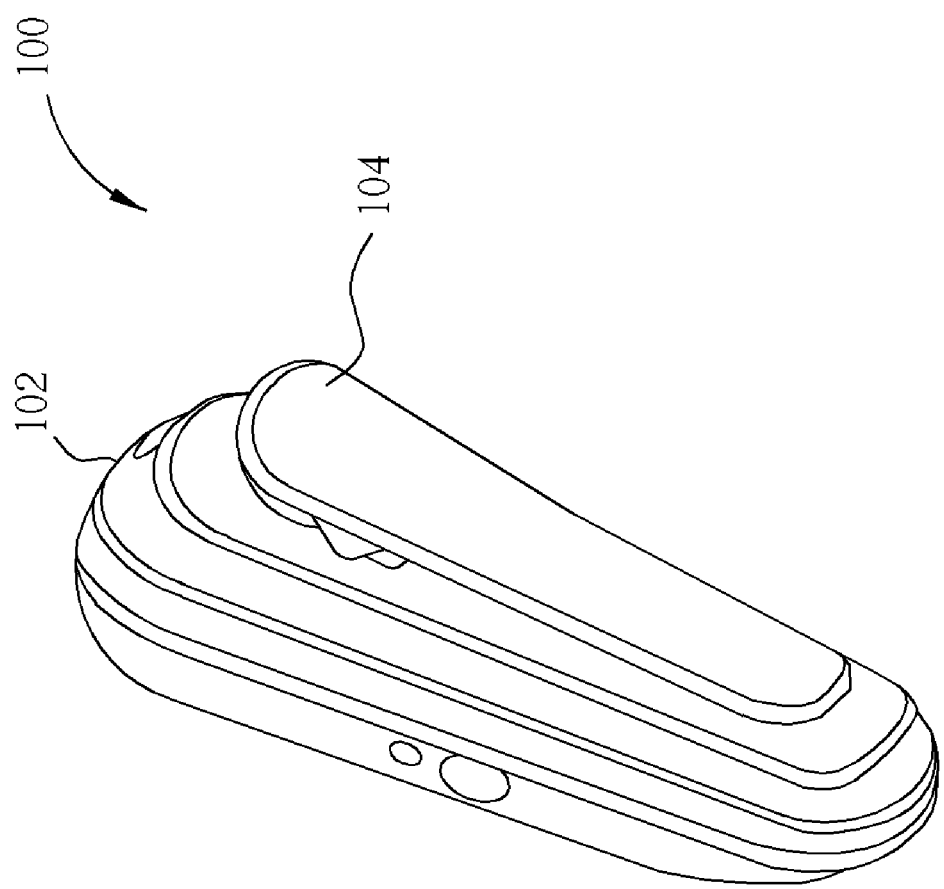
FIG. 3 is a diagram illustrating a wireless signal receiving apparatus according to an embodiment of the present invention.

Please refer to FIG. 3. FIG. 3 is a diagram illustrating a wireless signal receiving apparatus 100 according to an embodiment of the present invention. In this embodiment, the wireless signal receiving apparatus 100 is a Bluetooth earphone device for receiving a Bluetooth signal, those skilled in the art, however, will observe that in other embodiment of the present invention the wireless signal can be another signal that conforms to other wireless communicating specifications. In FIG. 3, the wireless signal receiving apparatus 100 comprises a housing 102 and a clamping device 104.

Figure 4:
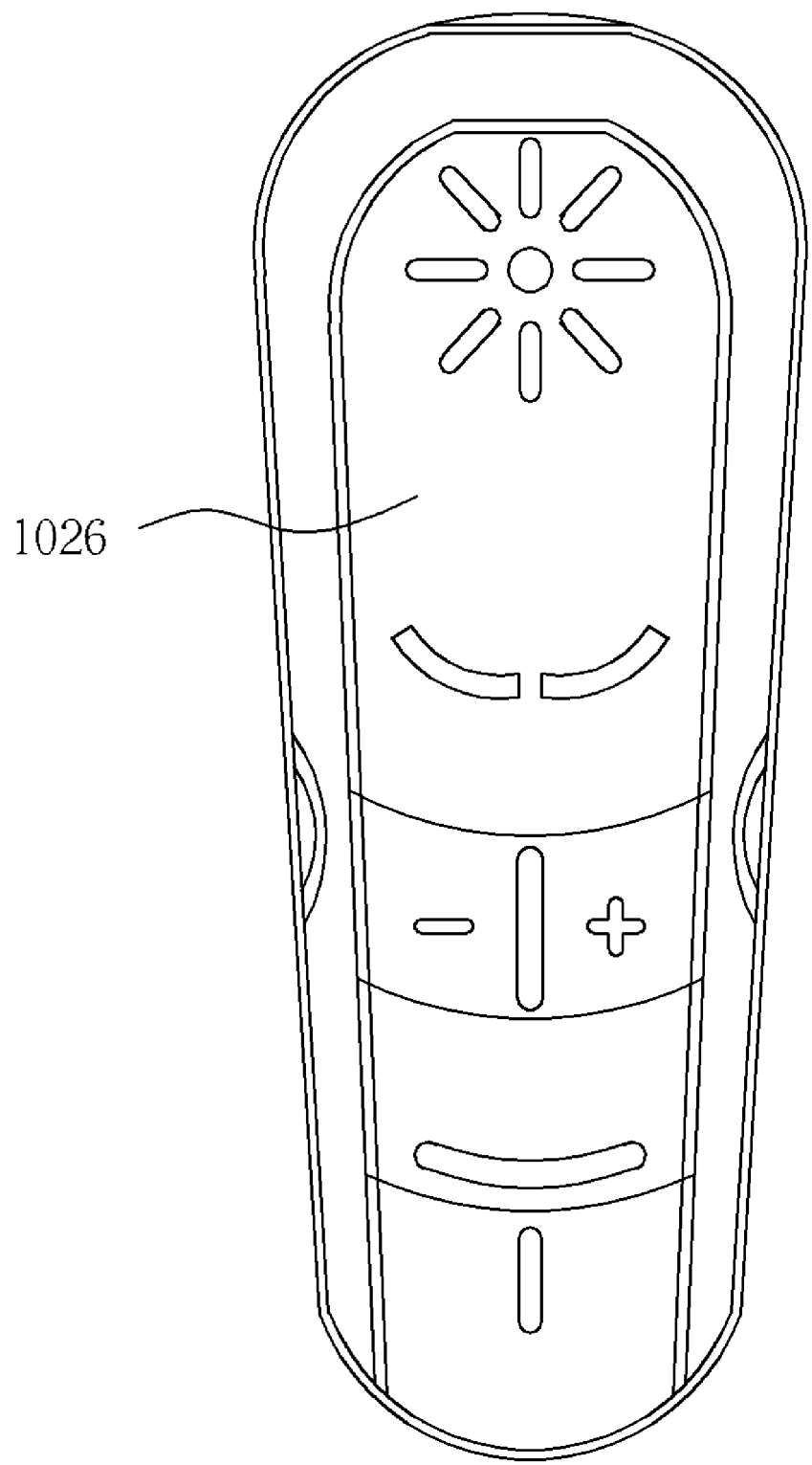
FIG. 4 is a diagram illustrating a front view of the wireless signal receiving apparatus of FIG. 3.
Figure 5:
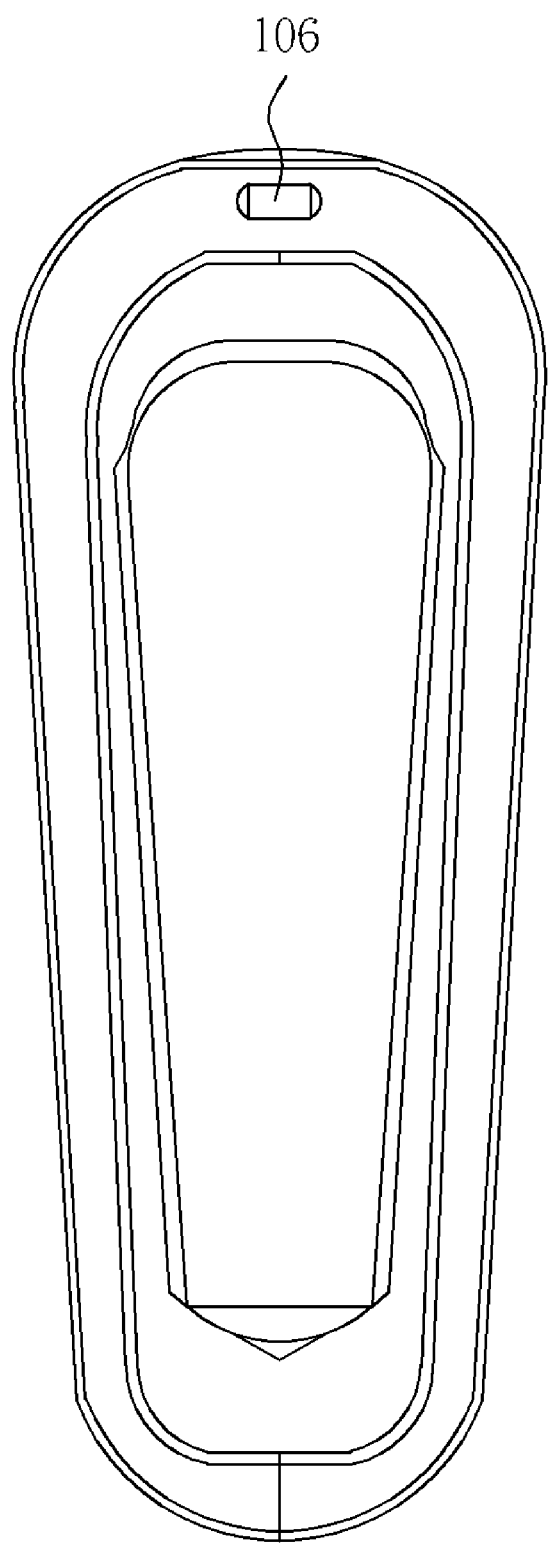
FIG. 5 is a diagram illustrating a rear view of the wireless signal receiving apparatus of FIG. 3.
Figure 6:
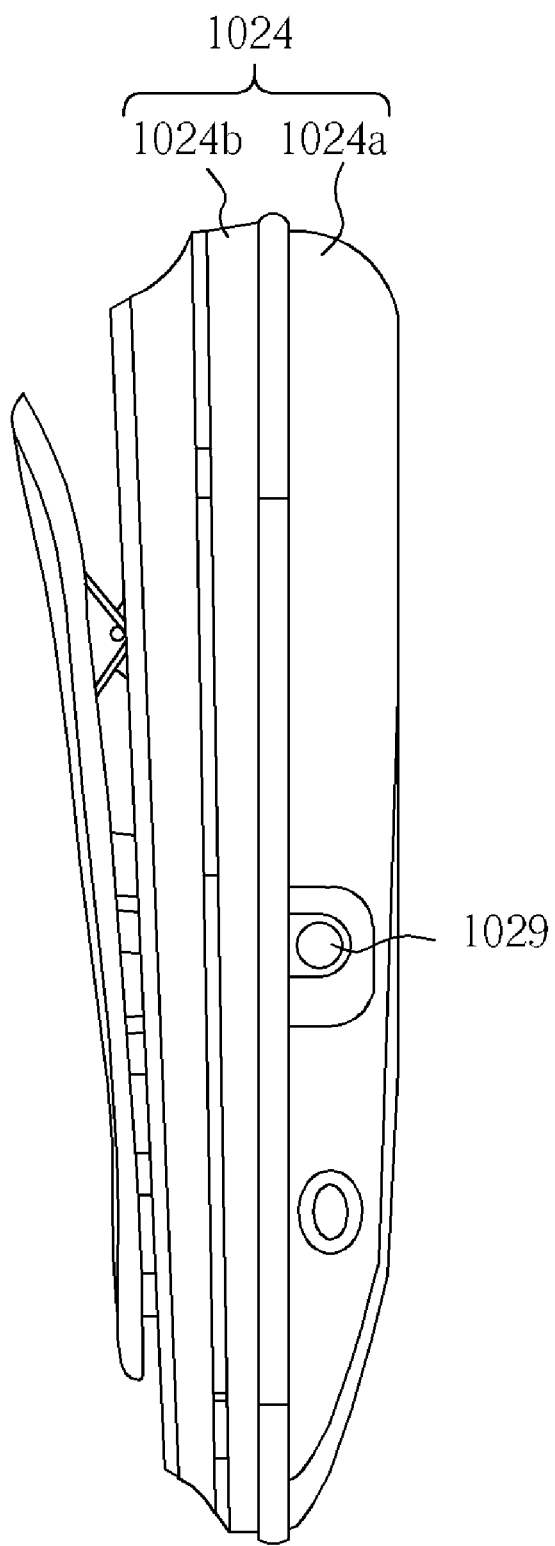
FIG. 6 is a diagram illustrating a left side view of the wireless signal receiving apparatus of FIG. 3.
Figure 7:
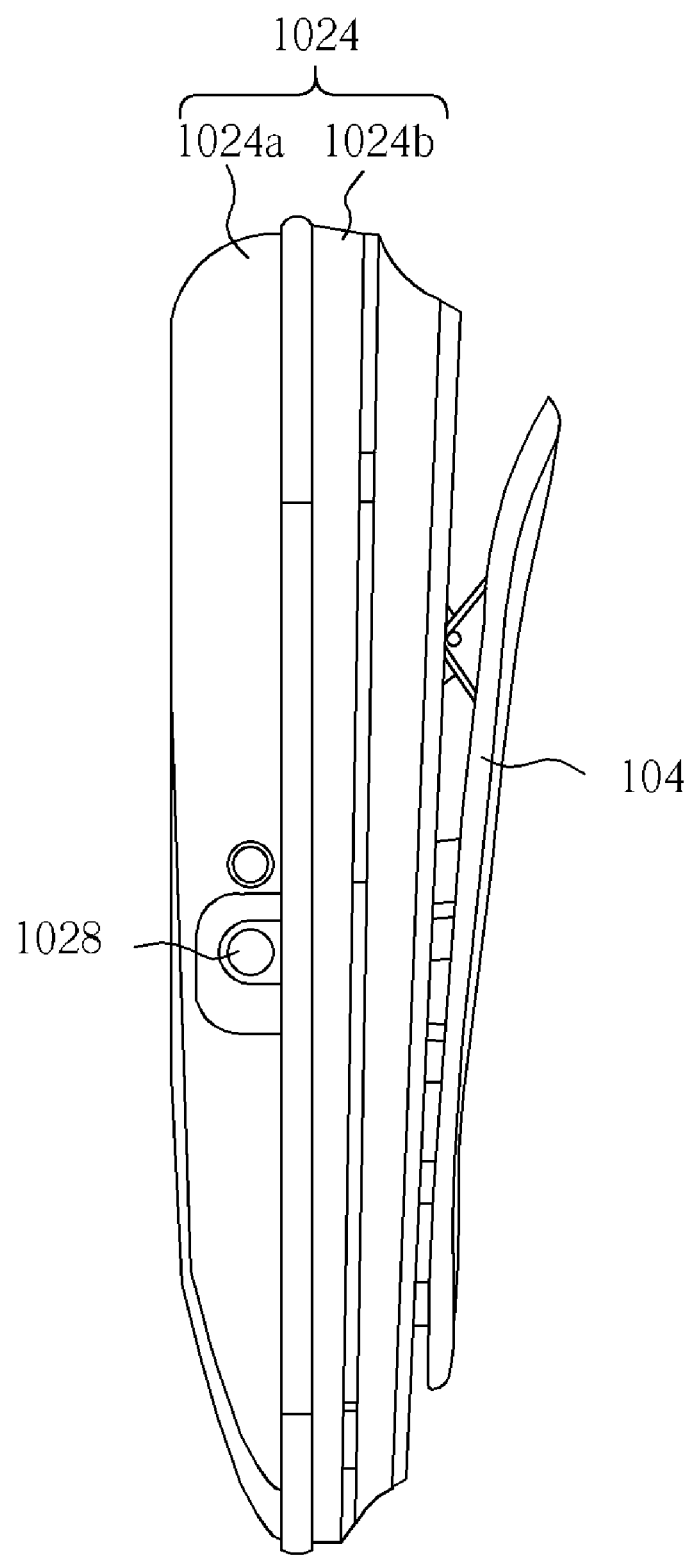
FIG. 7 is a diagram illustrating a right side view of the wireless signal receiving apparatus of FIG. 3.
Figure 8:
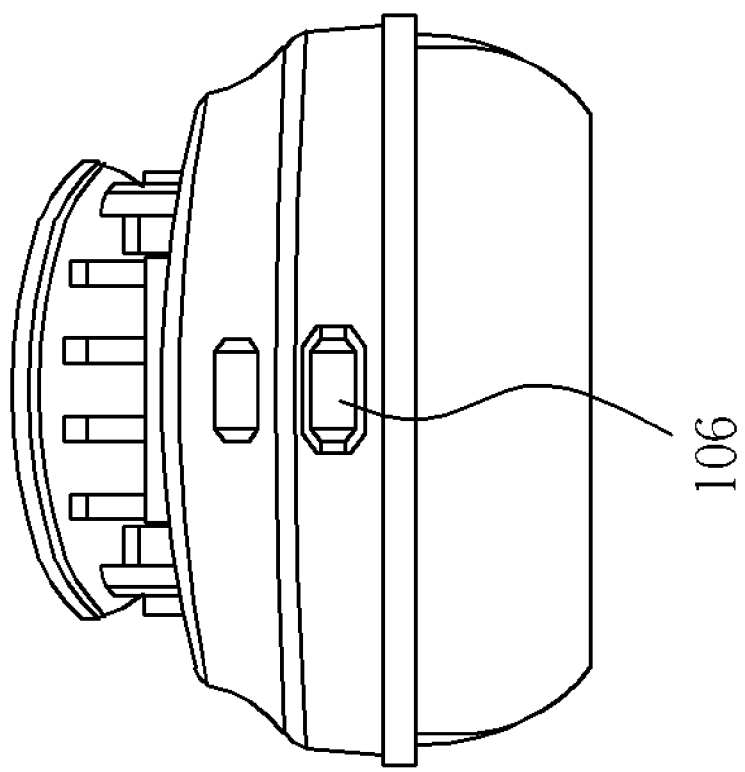
FIG. 8 is a diagram illustrating a top view of the wireless signal receiving apparatus of FIG. 3.
Figure 9:
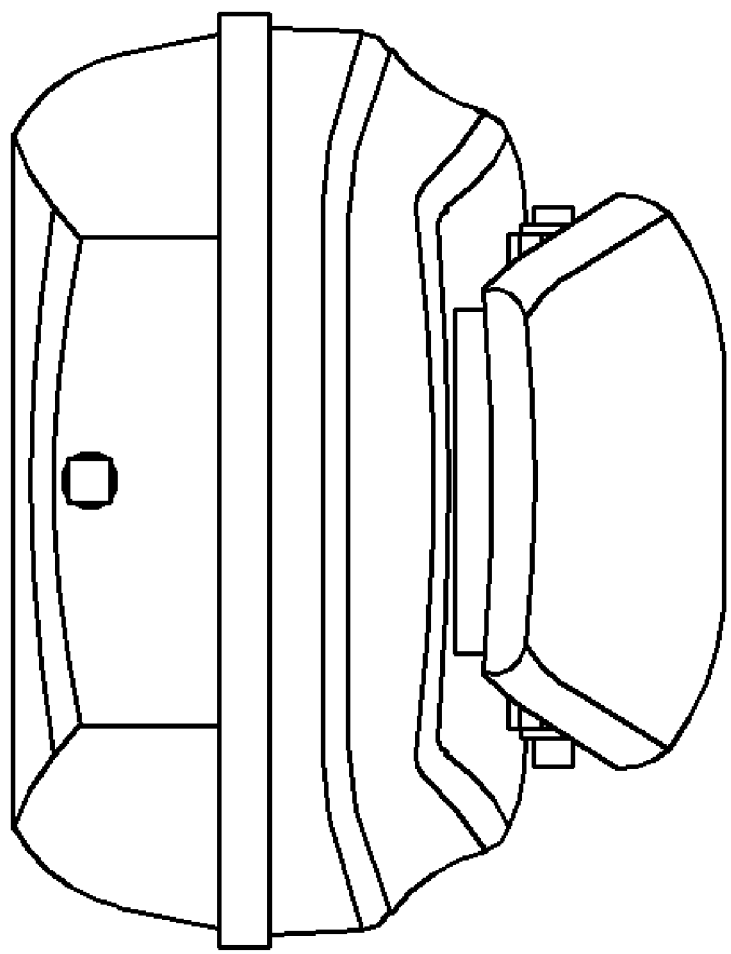
FIG. 9 is a diagram illustrating a bottom view of the wireless signal receiving apparatus of FIG. 3.

Please refer to FIG. 3 to FIG. 9. FIG. 4 illustrates a front view of the wireless signal receiving apparatus 100 of FIG. 3; FIG. 5 illustrates a rear view of the wireless signal receiving apparatus 100 of FIG. 3; FIG. 6 illustrates a left side view of the wireless signal receiving apparatus 100 of FIG. 3; FIG. 7 illustrates a right side view of the wireless signal receiving apparatus 100 of FIG. 3; FIG. 8 illustrates a top view of the wireless signal receiving apparatus 100 of FIG. 3; and FIG. 9 illustrates a bottom view of the wireless signal receiving apparatus 100 of FIG. 3. A strap bar 106 is installed on a housing 1024 (comprising a top housing 1024a and a bottom housing 1024b) of the housing 102 for installing a phone strap (not shown), and a set of operating interfaces 1026 are further installed on the housing 102 for enabling the user to control the operation of the wireless signal receiving apparatus 100. The wireless signal receiving apparatus 100 further comprises an earphone socket 1028 and a charging socket 1029, wherein the earphone socket 1028 is installed at an external side surface of the housing 1024. When an earphone is plugged into the earphone socket 1028, the wireless signal receiving apparatus 100 drives the earphone according to the wireless signal. The charging socket 1029 is installed at another external side surface of the housing 1024, so when an external charger is coupled to the charging socket 1029, the external charger charges a power supply module (e.g. a rechargeable battery) of the wireless signal receiving apparatus 100 via the charging socket 1029.

Figure 10:
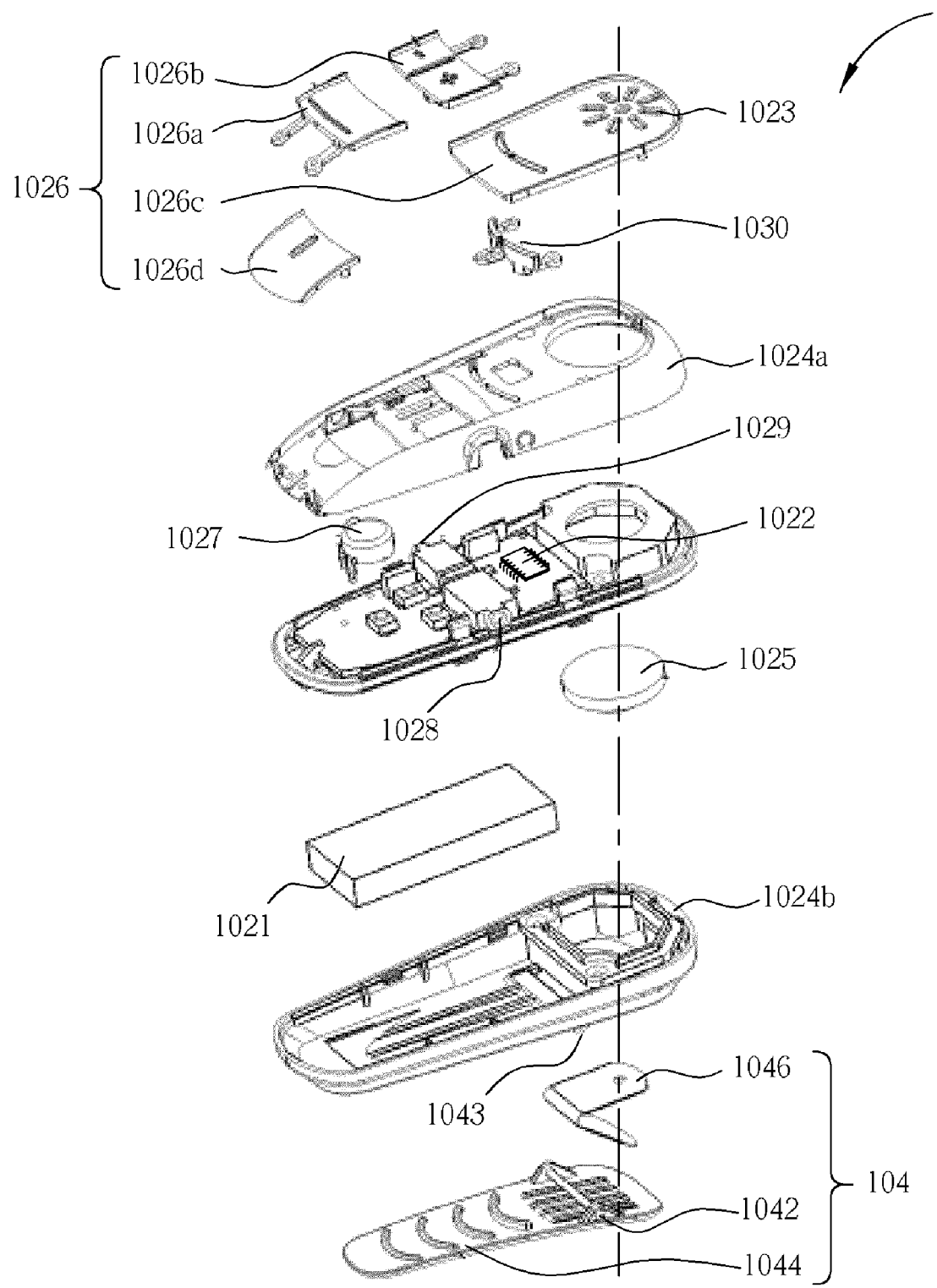
FIG. 10 is an exploded diagram of the wireless signal receiving apparatus of FIG. 3.

Please refer to FIG. 10. FIG. 10 is an exploded diagram of the wireless signal receiving apparatus 100 of FIG. 3. The housing 102 comprises a power supply module 1021 for providing an operating voltage of the wireless signal receiving apparatus 100. A signal processing module 1022 is installed in the housing 1024 of the housing 102 for processing the wireless signal, and a clamping device 104 fixedly coupled to an external bottom surface of the housing 1024 for providing a force in order to fix an object between the housing 1024 and clamping device 104, thereby clamping the wireless signal receiving apparatus 100 upon the object. The operating interface 1026 of the wireless signal receiving apparatus 100 comprises an activation control interface 1026a for selectively activating the wireless signal receiving apparatus 100; a volume control interface 1026b for controlling an output volume of the wireless signal receiving apparatus 100; an output display interface 1026c, comprising at least one indicating light for displaying an operating status of the wireless signal receiving apparatus 100; and a microphone receiving interface 1026d with a microphone 1026 installed below for receiving an audio signal. The wireless signal receiving apparatus 100 of the present invention further comprises a speaker device 1025 installed in the housing 1024, wherein the signal processing module 1022 drives the speaker device 1025 according to the wireless signal, and adjusts the output volume of the speaker device 1025 according to a volume control signal that is received by the volume control interface 1026b. Therefore, a volume output interface 1023 is installed at the output display interface 1026c and comprises a plurality of holes for outputting audio of the speaker device 1025. As shown in FIG. 10, the clamping device 104 comprises an axis 1042 installed at a fixed position 1043 of the bottom housing 1024b, a clip 1044 rotatably coupled to an axis 1042; and a leaf spring 1046 with a terminal fixedly coupled to the housing 1024, the other terminal providing a force to clip 1044 to fixed the object between the housing 1024 and the clip 1044.

When the wireless signal receiving apparatus 100 of the present invention receives the wireless signal (e.g. an incoming call) from a communication system (e.g. a cell phone), a user can activate the wireless signal receiving apparatus 100 by pressing the activation control interface 1026a, then the signal processing module 1022 processes the wireless signal and outputs the audio corresponding to the wireless signal via the speaker device 1025. If the user plugs an earphone into the earphone socket 1028, the wireless signal receiving apparatus 100 will automatically detect the audio and switch the audio to be output by the earphone. No matter whether the audio is output by the external earphone or the internal speaker device 1025, the volume control interface 1026b can adjust the volume of the audio. In this embodiment, the speaker device 1025 is implemented by a speaker, thus the signal processing module 1022 drives the speaker device 1025 to broadcast in mono mode; however, when the audio is output through the earphone, the signal processing module 1022 drives the earphone to broadcast in stereo mode; in other words, the audio output via the earphone socket 1028 is in stereo.

Furthermore, the wireless signal receiving apparatus 100 of the present invention also emits a wireless signal (e.g. a Bluetooth signal) to the communication system. For example, when the user utilizes the wireless signal receiving apparatus 100 to receive a song played by the communication system, the user can carry out song selection of the communication system through the volume control interface 1026b. For example, button (+) of the volume control interface 1026b can be utilized to select a next song, and button (−) can be utilized to select a previous song. When the wireless signal receiving apparatus 100 operates, the indicating light of the output display interface 1026c clearly displays the current operation of wireless signal receiving apparatus 100; in this embodiment, the indicating light is a power state indicating light. The flashing of the power state indicating light represents a low power situation of the power supply module 1021. In such a case, the user just needs to plug the external charger into charging socket 1029 for charging; and the power state indicating light will display a read light when in charging mode. Furthermore, the power state indicating light of the present invention is implemented by utilizing an LED emitting unit 1030 that is controlled by the signal processing module 1022.

Moreover, the wireless signal receiving apparatus 100 of the present invention is not only a portable apparatus, but the clamping device 104 can also clamp the wireless signal receiving apparatus 100 upon any object; and through the speaker device 1025, the wireless signal receiving apparatus 100 can be utilized as a hands-free earphone that does not need to be worn on the user's ear. For example, the user can safely pick up the cell-phone by the disclosed wireless signal receiving apparatus 100 when driving. Furthermore, as mentioned above, the user can plug an earphone into the wireless signal receiving apparatus 100 to utilize it as a normal Bluetooth earphone. Therefore, the wireless signal receiving apparatus 100 of the present invention is a new type Bluetooth earphone that has speaker and clamping functionality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless signal receiving apparatus, for receiving a wireless signal, comprising:
    a main body, comprising a signal processing module installed in a housing of the main body for processing the wireless signal; and
    a clamping device, fixedly coupled to the housing, for providing a force in order to fix an object between the housing and the clamping device, thereby clamping the wireless signal receiving apparatus upon the object, wherein an external top surface of the housing holds a set of operating interfaces, an external bottom surface of the housing is connected to the clamping device, the set of operating interfaces comprises:
        an activation control interface, for selectively activating the wireless signal receiving apparatus;
        a volume control interface, for controlling an output volume of the wireless signal receiving apparatus; and
        an output display interface, for displaying an operating status of the wireless signal receiving apparatus; and
    the clamping device comprises:
        an axis;
        a clip, rotatably coupled to the axis; and
        a leaf spring, wherein a terminal of the leaf spring is fixedly coupled to the housing, and the other terminal of the leaf spring is for providing a force to the clip for fixing the object between the housing and the clip.

2. The wireless signal receiving apparatus of claim 1, wherein the wireless signal is a Bluetooth signal.

3. The wireless signal receiving apparatus of claim 1 further comprising:
    a speaker device installed in the housing;
    wherein the signal processing module drives the speaker device according to the wireless signal, and adjusts the output volume of the speaker device according to a volume control signal received by the volume control interface.

4. The wireless signal receiving apparatus of claim 1, wherein the output display interface comprises at least an indicating light for indicating the operating status of the wireless signal receiving apparatus.

5. The wireless signal receiving apparatus of claim 1 further comprising:
- an earphone socket, installed at an external side surface of the housing;
- wherein when an earphone is plugged into the earphone socket, the signal processing module drives the earphone according to the wireless signal.

6. The wireless signal receiving apparatus of claim 5 wherein the signal process module drives the earphone to output stereo sound according to the wireless signal.

7. The wireless signal receiving apparatus of claim 1 further comprising:
- a charging socket, installed at an external side surface of the housing;
- wherein when an external charger is plugged into the charging socket, the external charger charges a power supply module of the wireless signal receiving apparatus via the charging socket.

8. The wireless signal receiving apparatus of claim 1, wherein the housing further comprises a strap bar for installing a phone strap.

9. A wireless signal receiving apparatus, for receiving a wireless signal, comprising:
- a main body, comprising a signal processing module installed in a housing of the main body for processing the wireless signal;
- a clamping device, fixedly coupled to the housing, for providing a force in order to fix an object between the housing and the clamping device, thereby clamping the wireless signal receiving apparatus upon the object, wherein the clamping device comprises:
  - an axis;
  - a clip, rotatably coupled to the axis; and
  - a leaf spring, wherein a terminal of the leaf spring is fixedly coupled to the housing, and the other terminal of the leaf spring is for providing a force to the clip for fixing the object between the housing and the clip; and
- an earphone socket, installed at an external side surface of the housing;
- wherein an external top surface of the housing holds a set of operating interfaces, and an external bottom surface of the housing is connected to the clamping device, and when an earphone is plugged into the earphone socket, the signal processing module drives the earphone according to the wireless signal.

10. The wireless signal receiving apparatus of claim 9, wherein the signal process module drives the earphone to output stereo sound according to the wireless signal.

11. A wireless signal receiving apparatus, for receiving a wireless signal, comprising:
- a main body, comprising a signal processing module installed in a housing of the main body for processing the wireless signal;
- a clamping device, fixedly coupled to the housing, for providing a force in order to fix an object between the housing and the clamping device, thereby clamping the wireless signal receiving apparatus upon the object, wherein the clamping device comprises:
  - an axis
  - a clip, rotatably coupled to the axis; and
  - a leaf spring, wherein a terminal of the leaf spring is fixedly coupled to the housing, and the other terminal of the leaf spring is for providing a force to the clip for fixing the object between the housing and the clip; and
- a charging socket, installed at an external side surface of the housing;
- wherein an external top surface of the housing holds a set of operating interfaces, and an external bottom surface of the housing is connected to the clamping device, and when an external charger is plugged into the charging socket, the external charger charges a power supply module of the wireless signal receiving apparatus via the charging socket.

* * * * *